United States Patent
Akagawa et al.

(10) Patent No.: US 10,575,030 B2
(45) Date of Patent: Feb. 25, 2020

(54) SYSTEM, METHOD, AND PROGRAM FOR DISTRIBUTING VIDEO

(71) Applicant: DeNA Co., Ltd., Shibuya-ku, Tokyo (JP)

(72) Inventors: Junichi Akagawa, Tokyo (JP); Hiroyuki Kawakami, Tokyo (JP); Masami Ogawa, Tokyo (JP); Marika Jufuku, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 48 days.

(21) Appl. No.: 15/630,771

(22) Filed: Jun. 22, 2017

(65) Prior Publication Data

US 2017/0374391 A1 Dec. 28, 2017

(30) Foreign Application Priority Data

Jun. 22, 2016 (JP) ................................. 2016-123254

(51) Int. Cl.
*H04N 21/2187* (2011.01)
*H04N 21/4788* (2011.01)
(Continued)

(52) U.S. Cl.
CPC ..... *H04N 21/2187* (2013.01); *H04L 65/4092* (2013.01); *H04L 65/60* (2013.01);
(Continued)

(58) Field of Classification Search
USPC ........................................ 709/231, 203, 232
See application file for complete search history.

(56) References Cited

U.S. PATENT DOCUMENTS 6,952,221 B1* 10/2005 Holtz .................. G11B 27/034
  715/719
9,167,289 B2* 10/2015 Stinson, III ........ H04N 21/4223
(Continued)

FOREIGN PATENT DOCUMENTS

JP 2003-296239 A 10/2003
JP 2005-006085 A 1/2005
(Continued)

OTHER PUBLICATIONS

Office Action for JP App No. 2016-123254 dated Feb. 15, 2017, 3 pgs.
(Continued)

*Primary Examiner* — Jude Jean Gilles
(74) *Attorney, Agent, or Firm* — Procopio, Cory, Hargreaves & Savitch LLP

(57) ABSTRACT

The video distribution system pertaining to an embodiment of the present invention comprises a video distribution server and a user terminal that is connected to said video distribution server via a network so as to allow communication. The video distribution server provides a video distribution service, with which video provided by a distribution user is distributed to viewing users, via the user terminal. The video distribution system is such that an object specified by a viewing user is placed on the video in response to the receipt of a request from the viewing user to place an image object, during the real-time distribution of video provided by the distribution user.

13 Claims, 14 Drawing Sheets

(51) Int. Cl.
  *H04N 21/414* (2011.01)
  *H04L 29/06* (2006.01)
  *H04N 21/6587* (2011.01)
  *H04N 21/81* (2011.01)
  *H04N 21/854* (2011.01)
  *G06F 13/00* (2006.01)
  *H04L 12/58* (2006.01)

(52) U.S. Cl.
  CPC ..... *H04L 65/602* (2013.01); *H04N 21/41407* (2013.01); *H04N 21/4788* (2013.01); *H04N 21/6587* (2013.01); *H04N 21/8146* (2013.01); *H04N 21/854* (2013.01); *H04L 51/04* (2013.01); *H04L 51/10* (2013.01)

(56) References Cited

U.S. PATENT DOCUMENTS

| | | | |
|---|---|---|---|
| 9,191,607 B2 * | 11/2015 | Kondo | H04N 21/41407 |
| 9,191,630 B2 * | 11/2015 | Fleming | H04N 7/181 |
| 9,462,017 B1 * | 10/2016 | Siracusano, Jr. | H04L 65/4038 |
| 2003/0051256 A1 * | 3/2003 | Uesaki | H04N 5/222 |
| | | | 725/144 |
| 2004/0064510 A1 | 4/2004 | Ooi et al. | |
| 2009/0070324 A1 * | 3/2009 | Yoshino | H04N 7/17318 |
| 2012/0060177 A1 * | 3/2012 | Stinson, III | H04N 21/4223 |
| | | | 725/12 |
| 2012/0213493 A1 * | 8/2012 | Luo | G11B 27/105 |
| | | | 386/248 |
| 2012/0213497 A1 * | 8/2012 | Lou | G11B 27/00 |
| | | | 386/343 |
| 2013/0041491 A1 | 2/2013 | Itoyanagi et al. | |
| 2013/0251337 A1 * | 9/2013 | Abecassis | H04N 9/8715 |
| | | | 386/239 |
| 2013/0311595 A1 * | 11/2013 | Milatinovici | H04N 21/26275 |
| | | | 709/214 |
| 2015/0281296 A1 * | 10/2015 | Takaichi | A63F 13/355 |
| | | | 709/231 |
| 2016/0119670 A1 * | 4/2016 | Izutsu | H04N 21/2187 |
| | | | 725/116 |
| 2016/0132231 A1 * | 5/2016 | Rathod | H04N 5/23216 |
| | | | 715/719 |
| 2016/0255139 A1 * | 9/2016 | Rathod | G06F 16/9535 |
| | | | 709/203 |
| 2017/0169540 A1 * | 6/2017 | Satori | H04N 21/2187 |
| 2017/0374391 A1 * | 12/2017 | Akagawa | H04L 65/4092 |
| 2018/0035019 A1 * | 2/2018 | Back | H04B 10/116 |
| 2019/0132614 A1 * | 5/2019 | Kasahara | H04N 21/23418 |

FOREIGN PATENT DOCUMENTS

| | | |
|---|---|---|
| JP | 2011-172200 A | 9/2011 |
| JP | 2015-073175 A | 4/2015 |

OTHER PUBLICATIONS

Office Action for JP App No. 2016-123254 dated Sep. 12, 2016, 3 pgs.

* cited by examiner

User information table 411

| User ID |
| --- |
| Basic information |
| Distribution history information |
| Viewing history information |
| Owned stamp information |
| ... |

FIG. 3

Distribution information table 412

| Distribution ID |
| --- |
| Distribution user ID |
| Distribution title |
| Distribution status |
| ... |

FIG. 4

Object information table 413

| Stamp ID |
| --- |
| Image data |
| Display time |
| .... |

FIG. 5

SYSTEM, METHOD, AND PROGRAM FOR DISTRIBUTING VIDEO

This application claims foreign priority under 35 USC 119 based on Japanese Patent Application No. 2016-123254, filed on Jun. 22, 2016, the contents of which is incorporated herein in its entirety by reference.

BACKGROUND

1. Technical Field

The present invention relates to a system, a method, and a program (e.g., non-transitory computer-readable medium having a storage including instructions to be performed by a processor) for distributing video.

2. Related Art

Systems that provide a video distribution service, with which real-time video sent from the user terminal of a distribution user is distributed to the user terminals of a plurality of viewing users, are known (see Patent Document 1, for example). Some of these systems are configured so that the viewing users can input comments to the video, and the inputted comments are typically shared between the distribution user and other viewing users who view the same video. This comment function allows for communication between the users of the video distribution service.

RELATED ART DOCUMENT

Patent Document

[Patent Document 1] Japanese Patent Application 2011-172200

SUMMARY

However, since the conventional comment function discussed above involves nothing more than sharing of inputted comments, the resulting communication tends to be uninteresting. Also, there are some users who consider the inputting of comments to be an inconvenience, and such users hesitate to make use of the comment function. Thus, with related art, communication between users tends to be uninteresting, and since it puts a relatively heavy burden on the user, the users may end up not taking advantage of communication.

It is an object of embodiments of the present invention to promote communication among users in the distribution of video. Other objects of embodiments of the present invention will become clear through reference to this Specification as a whole.

The system pertaining to an embodiment of this invention is a system for distributing video, said system comprising one or more computer processors, wherein the one or more computer processors execute the following in response to the execution of a readable command: processing to distribute real-time video provided by a distribution user to each of a plurality of viewing users; processing to receive from a viewing user a request to place an image object on a video during the distribution of the video, this being a placement request that includes information related to the image object specified by the viewing user; and processing to place the image object specified by the viewing user on the video in response to the receipt of the placement request.

The method pertaining to an embodiment of this invention is a method for distributing video, executed by one or more computer processors, said method comprising the steps of: distributing real-time video provided by a distribution user to each of a plurality of viewing users; receiving from a viewing user a request to place an image object on a video during the distribution of the video, this being a placement request that includes information related to the image object specified by the viewing user; and placing the image object specified by the viewing user on the video in response to the receipt of the placement request.

The program pertaining to an embodiment of this invention is a program (e.g., non-transitory computer-readable medium having a storage including instructions to be performed by a processor) for distributing video, said program causing one or more computers to execute the following in response to being executed on the one or more computers: processing to distribute real-time video provided by a distribution user to each of a plurality of viewing users; processing to receive from a viewing user a request to place an image object on a video during the distribution of the video, this being a placement request that includes information related to the image object specified by the viewing user; and processing to place the image object specified by the viewing user on the video in response to the receipt of the placement request.

Effects of the Invention

Various embodiments of the present invention promote communication among users in the distribution of video.

BRIEF DESCRIPTION OF THE DRAWINGS

FIG. 3 An example of the information managed in a user information table 411.

FIG. 4 An example of the information managed in a distribution information table 412.

FIG. 5 An example of the information managed in an object information table 413.

DETAILED DESCRIPTION

Embodiments of the present invention will now be described through reference to the drawings.

Figure 1:
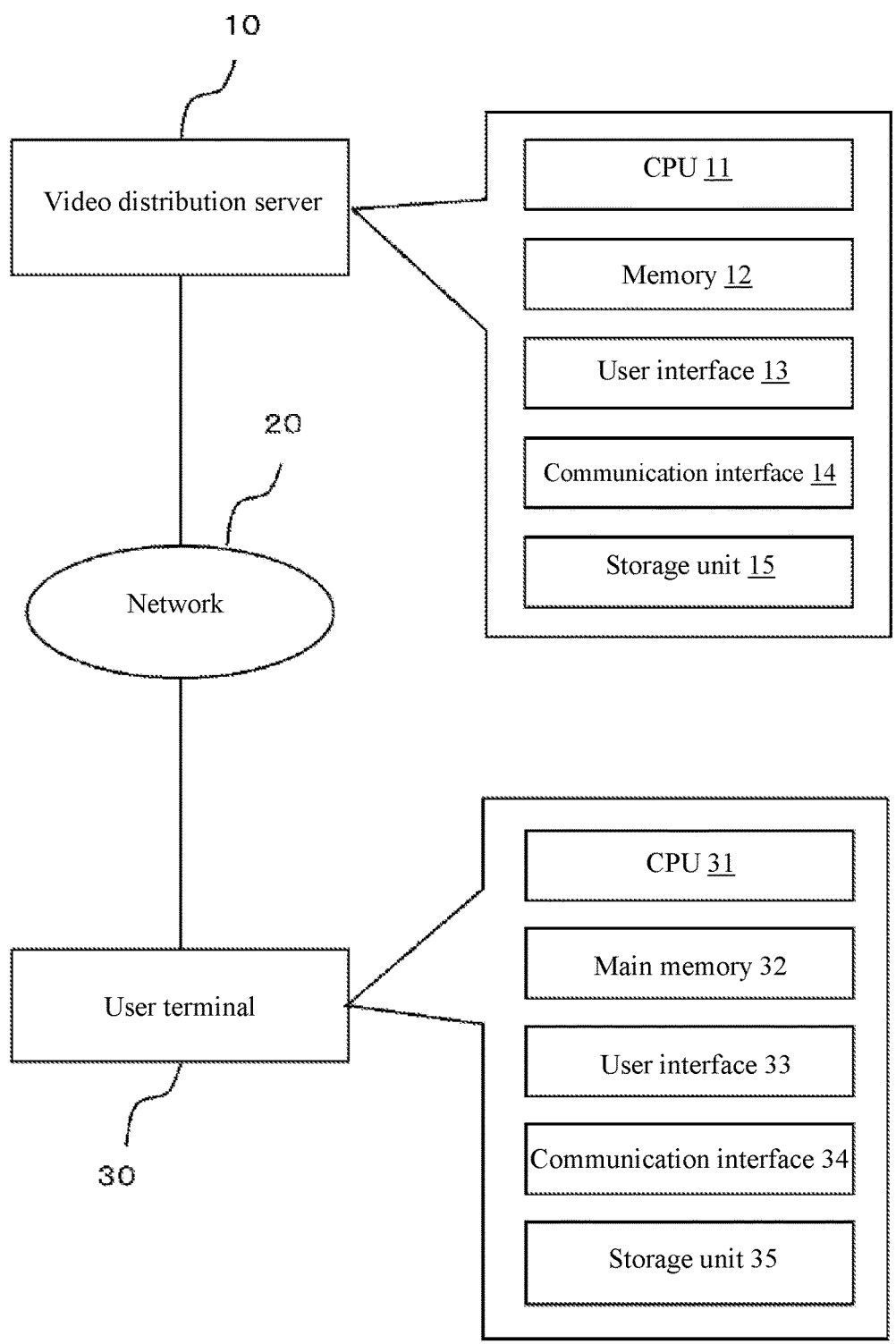
FIG. 1 A simplified diagram of the configuration of the network of the video distribution system 1 pertaining to an embodiment of the present invention.

FIG. 1 is a simplified diagram of the configuration of the network of the video distribution system 1 pertaining to an embodiment of the present invention. As shown in FIG. 1, the video distribution system 1 comprises a video distribution server 10 and user terminals 30 that are connected to the video distribution server 10 so as to allow communication via a network 20 such as the Internet. In FIG. 1, only one user terminal 30 is depicted, but the video distribution system 1 comprises a plurality of user terminals 30. The video distribution server 10 provides a video distribution service, with which real-time video provided by a distribution user is distributed to viewing users, via the user terminals 30. In this embodiment, the users of the user terminals 30 can distribute video as a distribution user, and can also view video distributed by other users, as a viewing user.

The video distribution server 10 is configured as a normal computer and, as shown in FIG. 1, comprises a CPU (computer processor) 11, a main memory 12, a user interface 13, a communication interface 14, and a storage unit (memory device) 15. These constituent elements are electrically connected via a bus or the like (not shown).

The CPU 11 reads the various programs (e.g., non-transitory computer-readable medium having a storage including instructions to be performed by a processor) stored in the storage unit 15, etc., into the main memory 12, and executes a variety of commands included in these programs. The main memory 12 is constituted by a DRAM, for example.

The user interface 13 includes a variety of input/output devices for exchanging information between users. The user interface 13 includes, for example, a keyboard, a pointing device (such as a mouse or a touch panel), or another such information input device, a microphone or another such audio input device, and a camera or another such video input device. The user interface 13 also includes a display or another such information output device, and a speaker or another such audio output device.

The communication interface 14 is implemented as a network adapter or other such hardware, any of various kinds of communication software, or a combination of these, and is configured to allow wired or wireless communication via the network 20, etc.

The storage unit 15 is constituted by a magnetic disk, a flash memory, or the like. The storage unit 15 stores various programs (e.g., non-transitory computer-readable medium having a storage including instructions to be performed by a processor) including an operating system, various kinds of data, and so on.

In this embodiment, the video distribution server 10 can be configured as a plurality of computers each having the hardware configuration discussed above. For instance, the server 10 can be constituted by one or more server devices.

The video distribution server 10 thus configured functions as a web server and an application server, executes various kinds of processing in response to a request from the web browser and other applications installed on the user terminal 30 (such as an application for video distribution service), and sends image data (such as HTML data), control data, and the like to the user terminal 30 according to the result of this processing. At the user terminal 30, a web page or other screen based on the received data is displayed.

The user terminal 30 is configured as a normal computer and, as shown in FIG. 1, comprises a CPU (computer processor) 31, a main memory 32, a user interface 33, a communication interface 34, and a storage unit (memory device) 35. These constituent elements are electrically connected via a bus or the like (not shown).

The CPU 31 reads the various programs stored in the storage unit 35, etc., into the main memory 32, and executes a variety of commands included in these programs. The main memory 32 is constituted by a DRAM, for example.

The user interface 33 is any of a variety of input/output devices for exchanging information between users. The user interface 33 includes, for example, a keyboard, a pointing device (such as a mouse or a touch panel), or another such information input device, a microphone or another such audio input device, and a camera or another such video input device. The user interface 33 also includes a display or another such information output device, and a speaker or another such audio output device.

The communication interface 34 is implemented as a network adapter or other such hardware, any of various kinds of communication software, or a combination of these, and is configured to allow wired or wireless communication via the network 20, etc.

The storage unit 35 is constituted by a magnetic disk, a flash memory, or the like. The storage unit 35 stores various programs (e.g., non-transitory computer-readable medium having a storage including instructions to be performed by a processor) including an operating system, various kinds of data, and so on. The programs stored by the storage unit 35 can downloaded and installed from an application market or the like.

In this embodiment, the user terminal 30 can be a smart phone, a tablet terminal, a wearable device, a personal computer, a dedicated game terminal, or the like.

The user of the user terminal 30 thus configured communicates with the video distribution server 10 via the web browser or other application installed in the storage unit 35, etc., and can thereby take advantage of the video distribution service provided by the video distribution server 10.

Figure 2:
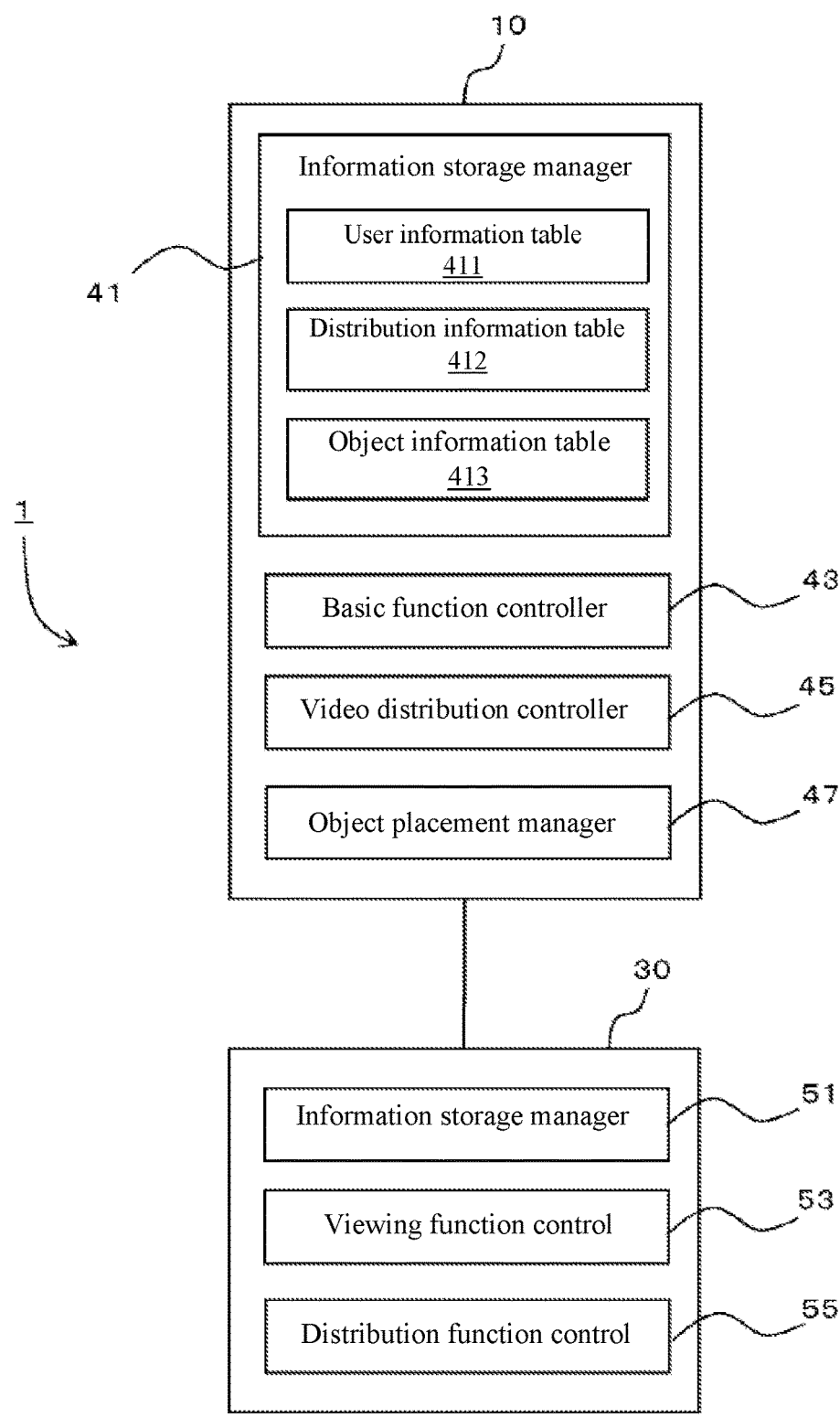
FIG. 2 A simplified block diagram of the functions of the video distribution system 1.

The functions of the video distribution system 1 in this embodiment will now be described. FIG. 2 is a simplified block diagram of the functions of the video distribution server 10 and the user terminal 30. As shown in FIG. 2, the video distribution server 10 has an information storage manager 41 that stores and manages various kinds of information, a basic function controller 43 that controls the basic functions of the video distribution service, a video distribution controller 45 that controls the distribution of video, and an object placement manager 47 that manages the placement of image objects on a video. These functions are realized by cooperative operation between the CPU 11, the main memory 12, or other such hardware, and the various programs, data, and so forth stored in the storage unit 15, etc. For example, they are realized by having the CPU 11 execute commands included in programs (e.g., non-transitory computer-readable medium having a storage including instructions to be performed by a processor) read into the main memory 12. Some or all of the functions of the video distribution server 10 shown in FIG. 2 can be realized by cooperation between the server 10 and the user terminal 30, or by the user terminal 30 alone. For instance, some or all of the functions of the object placement manager 47 can be realized by cooperation between the server 10 and the user terminal 30, or by the user terminal 30 alone.

As shown in FIG. 2, the user terminal 30 has an information storage manager 51 that stores and manages various kinds of information, a viewing function controller 53 that controls the viewing functions in the video distribution service, and a distribution function controller 55 that controls the distribution functions in the video distribution service. These functions are realized by cooperative operation between the CPU 31, the main memory 32, or other such hardware, and the various programs, data, and so forth stored in the storage unit 35, etc. For example, they are realized by having the CPU 31 execute commands included in programs (e.g., non-transitory computer-readable medium having a storage including instructions to be performed by a processor) read into the main memory 32. Some or all of the functions of the user terminal 30 shown in FIG. 2 can be realized by cooperation between the server 10 and the user terminal 30, or by the server 10 alone. For instance, some or all of the functions of the viewing function controller 53 and the distribution function controller 55 can be realized by cooperation between the server 10 and the user terminal 30, or by the server 10 alone.

The information storage manager 41 of the server 10 stores and manages various kinds of information in the storage unit 15, etc. As shown in FIG. 2, the information storage manager 41 has, for example, a user information table 411 that manages information related to users of the video distribution service, a distribution information table 412 that manages information related to individual video distribution, and an object information table 413 that manages information related to image objects. This will be discussed in more detail below, but an image object is an object that a viewing user places on a video in the video distribution service in this embodiment.

The basic function controller 43 of the server 10 executes various processing related to the control of the basic functions of the video distribution service. For instance, the basic function controller 43 sends the user terminal 30 control data or HTML data for various screens related to basic functions, executes various processing in response to an input operation by a user via the screen displayed on the user terminal 30, and sends the user terminal 30 control data or HTML data according to the result of this processing. The basic functions controlled by the basic function controller 43 include, for example, login verification (user verification), billing control, user management (such as updating the user information table 411, etc.), and management of individual video distribution (such as updating the distribution information table 412, etc.).

The video distribution controller 45 of the server 10 executes various processing related to the control of video distribution. For instance, the video distribution controller 45 executes processing to distribute real-time video provided by the distribution user individually to a plurality of viewing users. More specifically, the video distribution controller 45 receives video data for real-time video sent from the user terminal 30 of the distribution user, for example, and sends the video data thus received to the user terminal 30 of the viewing user. This real-time video distribution is performed, for example, using a streaming method.

The video distributed in the video distribution service of this embodiment includes, for example, video corresponding to the display screen displayed via a display or the like of the user terminal 30 of the distribution user (hereinafter this may be referred to as "screen video"). This screen video includes audio outputted from a speaker or the like of the user terminal 30 of the distribution user. The distributed video also includes, for example, video captured with a camera or the like of the user terminal 30 of the distribution user (hereinafter this may be referred to as "captured video"). This captured video includes audio inputted through a microphone or the like of the user terminal 30 of the distribution user.

The object placement manager 47 of the server 10 executes various processing related to the management of distribution of image objects onto a video. For example, the object placement manager 47 instructs that an image object be placed on a video on the user terminal 30 of the distribution user upon receipt of a placement request to place an image object on a video from the user terminal 30 of a viewing user.

The information storage manager 51 of the user terminal 30 stores and manages various kinds of information in the storage unit 35, etc. For example, the information storage manager 51 stores information related to image objects that can be utilized by a user.

The viewing function controller 53 of the user terminal 30 executes various processing related to the control of the viewing functions of the video distribution service. These viewing functions are functions for the viewing, by the user of the user terminal 30 as a viewing user, of video distributed by another user. For instance, the viewing function controller 53 receives video data sent from the video distribution server 10, and displays (plays back) the real-time video provided by the distribution user on the basis of the received video data.

In this embodiment, the viewing function controller 53 receives from a viewing user a placement request to place an image object on a video during the distribution of the video. This placement request includes information related to the image object specified by the viewing user. For example, the viewing function controller 53 receives the specification of the image object by the viewing user, and the placement request for the specified image object, via a screen displayed on the user terminal 30.

The distribution function controller 55 of the user terminal 30 executes various processing related to the control of the distribution functions of the video distribution service. These distribution functions are functions for the user of the user terminal 30 to distribute a video as a distribution user. For example, the distribution function controller 55 generates video data for real-time video, and sends the video data thus generated to the video distribution server 10. When the distributed video is screen video, for instance, the distribution function controller 55 generates real-time video data of the screen video corresponding to the display screen displayed on the display, etc., of the user terminal 30, and sends the video data thus generated to the video distribution server 10. When the distributed video is captured video, for example, the distribution function controller 55 generates real-time video data of the captured video captured by a camera, etc., of the user terminal 30, and sends the video data thus generated to the video distribution server 10.

In this embodiment, the distribution function controller 55 places the image object specified by the viewing user on a video upon receipt of a placement request to place the image object on the video. For instance, the distribution function controller 55 places the image object specified by the viewing user on the video in response to an image object placement instruction from the object placement manager 47 of the server 10. For instance, when the distributed video is screen video, the distribution function controller 55 displays an image object on the display screen of the user terminal 30 in response to an image object placement instruction from the object placement manager 47. As a result, an image object is placed on the screen video corresponding to the display screen of the user terminal 30, and the screen video in which this image object has been placed is distributed to a plurality of viewing users.

Thus, with the video distribution system 1 in this embodiment, an image object specified by a viewing user is placed on the video being distributed, in response to a request from a viewing user. Therefore, the viewing users can enjoy communicating with other users through the placement of image objects on the video being viewed.

The image objects that are placed on the video include a variety of objects that can be displayed on a video. For instance, an image object is constituted by a still picture, or by a still picture having an animation effect. Image objects are provided to users by the provider of the video distribution service, etc. Also, image objects are, for example, generated according to an input operation by a user and are, for example, generated according to a handwritten input by a user.

In this embodiment, an image object specified by a viewing user can be placed at a specific position on the video, or at any position. For example, the object placement manager 47 of the server 10 or the distribution function controller 55 of the user terminal 30 can be configured to decide the position on the video where the image object will be placed according to a specific rule (including deciding the position at random).

Also, a viewing user may specify the position on the video where the image object is to be placed. In this case, the placement request received by the viewing function controller 53 of the user terminal 30 of the viewing user includes information related to the position on the video specified by the viewing user, in addition to information related to the image object. The distribution function controller 55 of the user terminal 30 of the distribution user places the image object specified by the viewing user at the position on the video specified by the viewing user upon receipt of this placement request (via a placement instruction from the object placement manager 47 of the server 10). The viewing user specifies the position on the corresponding video by means of a touch or click operation in the video display region where the video is displayed on the user terminal 30, for example. The position on the video is specified as coordinates in this video display region, for example.

In this embodiment, the image object placed on the video is specified, for example, by having the viewing user select from among a plurality of image objects. In this case, when a placement request for an image object is received from a viewing user, the viewing function controller 53 of the user terminal 30, for example, presents the viewing user with a plurality of image objects (such as image objects owned by the viewing user), and receives the selection of the image object by the viewing user from among the plurality of image objects that were presented.

Also, in this embodiment, image objects are generated on the basis of an input operation by a viewing user, and the image objects thus generated can be specified as an image object to be placed on a video. For instance, an image object is generated on the basis of handwritten input by the viewing user (e.g., a graphic or the like corresponding to the path of the handwritten input is generated as an image object), and the image object thus generated is specified as the image object to be placed on the video. In this case, the placement request received by the viewing function controller 53 of the user terminal 30 includes image data of the image object generated on the basis of handwritten input, for example. Also, this handwritten input may be performed in the video display region in which the video is displayed on the user terminal 30. In this case, the position of the handwritten input in the video display region can be specified as the position on the video where the image object is to be placed.

In this embodiment, the viewing function controller 53 of the user terminal 30 can be configured so that a viewing user will be notified of the receipt of a placement request when a placement request is received. This notification allows the viewing user who made the image object placement request to confirm the receipt of the placement request before the placement of the image object is reflected in the video. As a result, it is less likely that a viewing user will repeatedly make unnecessary placement requests for an image object because the placement of the image object is not reflected in the video.

Also, the viewing function controller 53 can be configured so as to limit the number of placement requests that can be received within a specific length of time. For instance, the viewing function controller 53 can be configured so that a placement request for an image object from a single viewing user will not be received if the elapsed time since the previous placement request for an image object is still within a specific length of time (such as three seconds).

Also, in this embodiment, the distribution function controller 55 of the user terminal 30 can be configured to delete (not display) an image object that has been placed on a video. For example, the distribution function controller 55 can be configured so that an object will be deleted when the elapsed time since placement on the video reaches a preset placement duration (such as 5 seconds).

In this embodiment, the above-mentioned placement duration can be set for each image object (in which case different placement durations may be set for at least some of the image objects). For example, the placement duration is set shorter the larger is the display size of an image object. Also, the placement duration can be set for each viewing user (in which case different placement durations may be set for at least some of the viewing users). For example, the placement duration may be set to a longer time the higher is the ranking of a viewing user in the video distribution service (for instance, the ranking becomes higher the more times a video has been distributed). This processing to delete an image object on the basis of the placement duration can be realized by cooperation between the distribution function controller 55 and the object placement manager 47 of the server 10.

Also, for example, the distribution function controller 55 can be configured so that an image object that has been placed on a video is deleted in response to a delete request from the distribution user for deleting an image object that has been placed on the video. For example, the distribution function controller 55 deletes the image objects specified by the distribution user out of the plurality of image objects placed on the video, or deletes all of the plurality of objects that have been placed on the video.

Also, in this embodiment, the distribution function controller 55 can be configured so that the position in a video of an image object that has been placed on the video is changed (the object is moved) in response to a position change request from the distribution user for changing the position in the video of an image object placed on the video. For example, the distribution function controller 55 moves an image object specified by the distribution user, out of the plurality of image objects that have been placed on the video, to the position in the video specified by the distribution user.

Next, a specific example will be used to describe the operation of the video distribution system 1 having these functions. With the video distribution service in this specific example, a screen video corresponding to the display screen of the user terminal 30 of the distribution user is distributed to the user terminal 30 of the viewing user as real-time video. This distribution of screen video is sometimes called "live streaming of a screen," or the like.

FIG. 3 shows an example of the information managed in the user information table 411. The user information table 411 manages information related to the users of the video distribution service and, as shown in FIG. 3, manages "basic information," which is basic information about a user such as account name, age, and sex, associated with the "user ID" that identifies an individual user, "distribution history information," which is information related to the history of video distribution by this user, "viewing history information," which is information related to the viewing history of this user of video distributed by other users, "owned stamp information," which is information related to the stamps owned by this user, and other such information.

Of the information managed in the user information table 411, the basic information is inputted by the user at the point when he first registers with the video distribution service (sets up an account), etc., after which this basic information is updated as needed according to instructions from the user. The distribution history information and viewing history information are also updated as needed according to the video distribution and viewing by the user.

In this specific example, a stamp is an image object that a viewing user places on a video. The user can acquire stamps in a variety of ways. For example, a user can purchase a stamp for value, or can acquire it at no charge.

FIG. 4 shows an example of the information managed in the distribution information table 412. The distribution information table 412 manages information related to individual video distributions and, as shown in FIG. 4, includes a "distribution user ID" that identifies the distribution user that distributes a video, the "distribution title" of this distribution, the "distribution status" of this distribution, and other such information associated with the "distribution ID" that identifies individual video distributions. The distribution status includes, for example, the number of viewing users viewing a distributed video (the current number, the highest number, etc.), the placement duration, and other such information.

Of the information managed in the distribution information table 412, the distribution ID, the distribution user ID, and the distribution title are set when the distribution of the video is commenced. The distribution status is updated as needed during the distribution of the video.

FIG. 5 shows an example of the information managed in an object information table 413. The object information table 413 manages information related to individual stamps provided by the video distribution service provider and, as shown in FIG. 5, manages information such as stamp "image data," "display time," and other such information associated with the "stamp ID" that identifies individual stamps. As will be discussed in detail below, the display time indicates the time (placement duration) until a stamp is deleted after being placed on a video.

Figure 6:
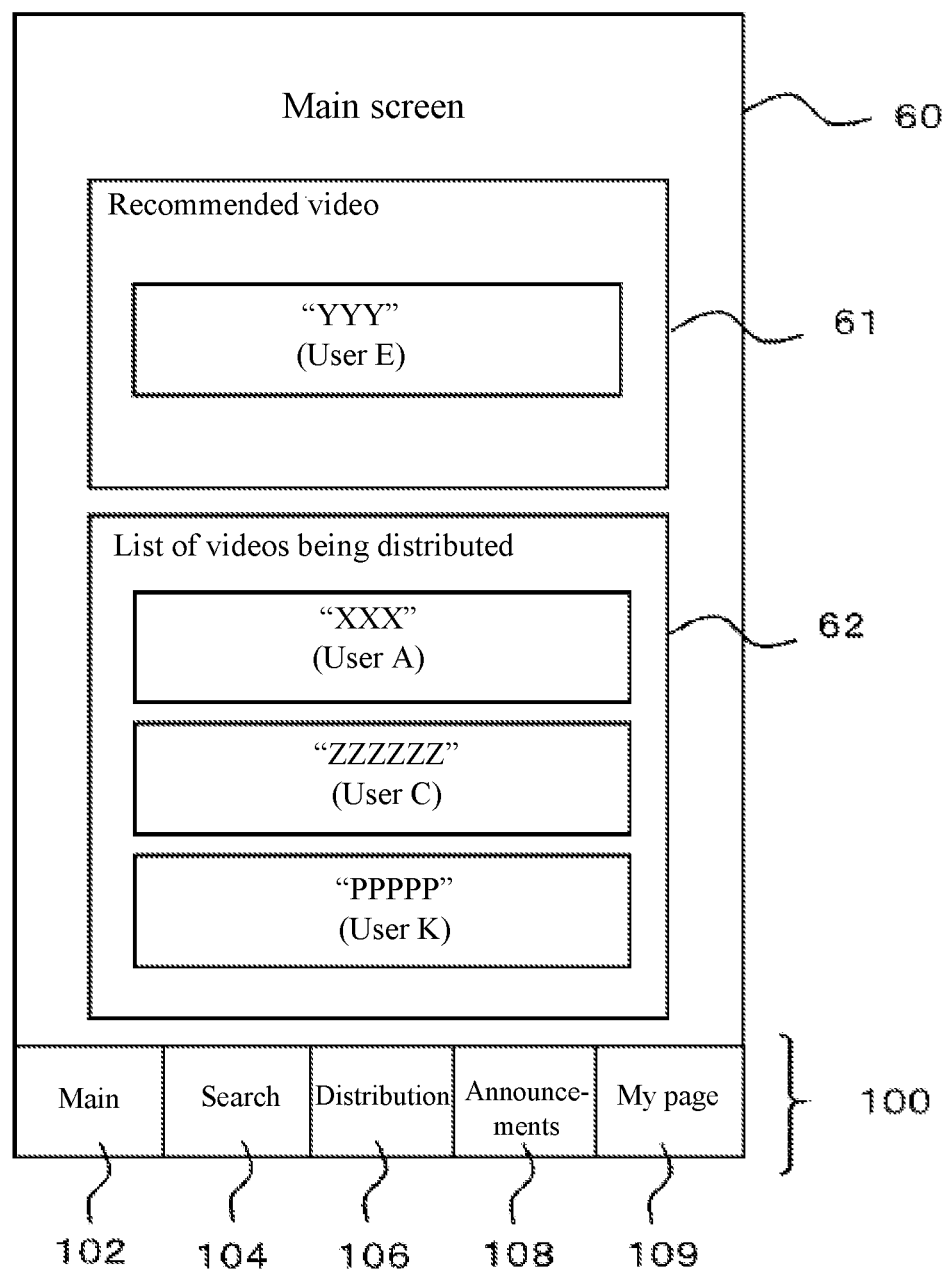
FIG. 6 An example of a main screen 60.

The operation of the video distribution system 1 in this specific example will now be described. First, the operation until the distribution user starts distributing screen video will be described. FIG. 6 shows an example of a main screen 60, which is the starting point when the user of the video distribution service makes use of this service. This main screen 60 is displayed, for example, when an application for the video distribution service is launched on the user terminal 30, or when the user terminal 30 uses a web browser to access a web site for the video distribution service provided by the server 10, etc.

As shown in FIG. 6, the main screen 60 has a recommendation area 61 in which recommended video is displayed, and a video list area 62 in which the videos being distributed are listed, and a basic menu area 100 is disposed at the bottom end of the main screen 60. The information related to video displayed in the recommendation area 61 and the video list area 62 includes the titles of the videos (distribution titles; in the example in FIG. 6, these are displayed as "YYY," "XXX," etc.), and distribution user information. The user can select one of the videos displayed in the recommendation area 61 and the video list area 62 to start viewing that video as a viewing user.

The basic menu area 100 is made up of the basic menu when utilizing the video distribution service, and is similarly disposed in other primary screens besides the main screen 60. The basic menu area 100, more specifically, is made up of a main menu 102 for displaying the main screen 60, a search menu 104 for searching for users or videos, a distribution menu 106 for starting the distribution of a video, an announcement menu 108 for displaying announcements to the user, and a my page menu 109 for displaying the user's own page (my page).

If the user selects the search menu 104, a search screen for searching for other users or videos using a keyboard or the like is displayed. If the user selects the my page menu 109, a my page screen is displayed that shows the user's own page (my page), and the user can, for example, browse and edit his own basic information, etc., via this screen, or can browse his distribution history or viewing history.

Figure 7:
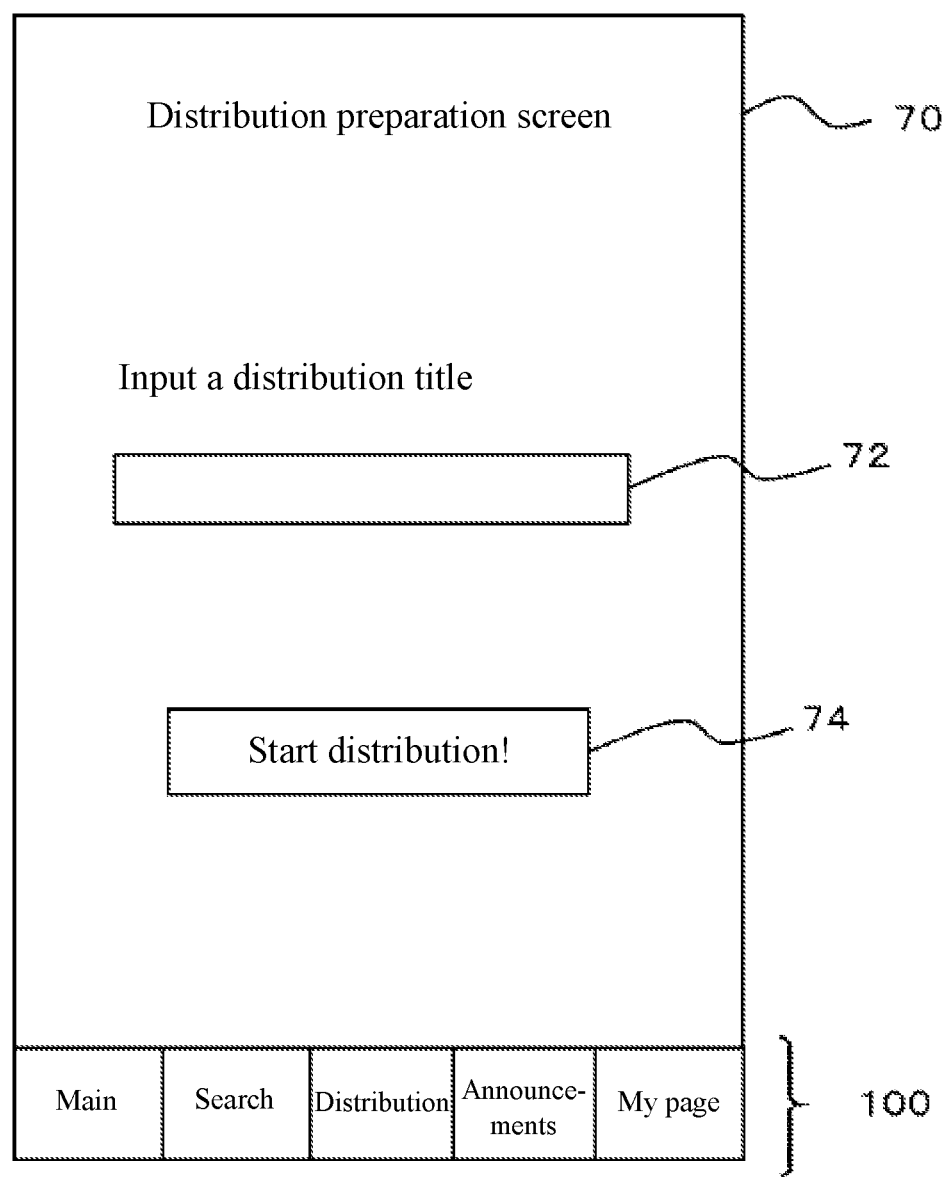
FIG. 7 An example of a distribution preparation screen 70.

If the user selects the distribution menu 106, the distribution preparation screen 70 shown as an example in FIG. 7 is displayed on the user terminal 30. As shown in FIG. 7, the distribution preparation screen 70 has a title input area 72 for inputting a distribution title and a distribution start button 74 displayed as "Start distribution," and the basic menu area 100 is disposed at the bottom end. This distribution preparation screen 70 is used by the user to start the distribution of video.

If the user selects the distribution start button 74 after having inputted the desired distribution title (such as "Live streaming of Game X!") in the title input area 72, the distribution preparation screen 70 is closed and the distribution of screen video is begun. More specifically, the generation of video data of the screen video corresponding to the display screen of the user terminal 30 and its transmission to the server 10 are commenced. Once the distribution of screen video begins, video data of this screen video is sent from the server 10 to the user terminal 30 of this viewing user in response to a request from the viewing user. A new record is produced in the distribution information table 412 at the start of the distribution.

Figure 8:
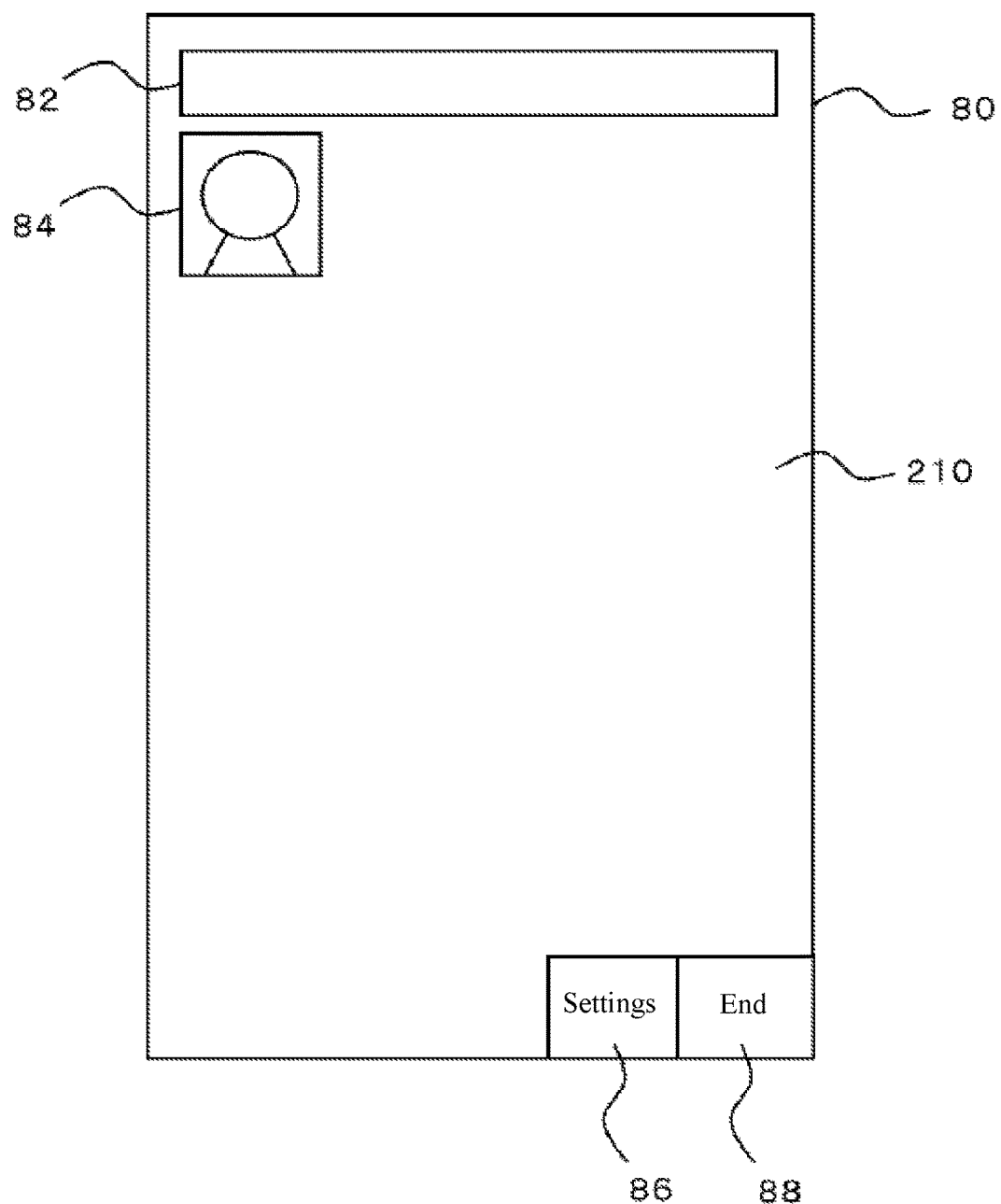
FIG. 8 An example of a distribution screen 80.

FIG. 8 shows an example of a distribution screen 80 displayed on the user terminal 30 of the distribution user during the distribution of video. This distribution screen 80 is displayed when the distribution start button 74 is selected and the distribution preparation screen 70 is closed. In this specific example, during the distribution of video, a program (e.g., non-transitory computer-readable medium having a storage including instructions to be performed by a processor) such as an application for the video distribution service runs in the background, and the home screen of the OS, or the screen of another running application is displayed, for example, in the display area 210 corresponding to the entire distribution screen 80.

As shown in FIG. 8, a comment input area 82 is disposed in a distribution screen 80 at the top of the screen, a camera image display area 84 is disposed thereunder on the left side, and a settings button 86 and an end button 88 are disposed in the lower-right corner of the screen, each being superposed over the display area 210. The comment input area 82 is configured to allow the user to input text strings or other such comments. The camera image display area 84 is used to display the image inputted via a front camera, etc., of the user terminal 30 of the distribution user (more specifically, video of the distribution user, for example).

If the user selects the settings button 86, various distribution settings can be adjusted through a settings screen (not shown). For example, the user can mute the microphone, deactivate the camera (including the non-display of the camera image display area 84), browse comments, turn off the display of the comment box (not display the comment input area 82), and adjust other such settings. The "browse comments" here is a setting for displaying comments inputted by the distribution user himself or comments inputted by a viewing user.

Here, the comment input area 82, the camera image display area 84, the settings button 86, and the end button 88 are widget-style objects controlled by an application or the like of the video distribution service that runs in the background. The user can execute an operation through the screen displayed in the display area 210 (an operation of the OS or of another application that is running) by tapping, etc., in an area other than those of the objects 82, 84, 86, and 88, out of the entire display area 210 of the distribution screen 80. Also, the user can change the display positions of the comment input area 82 and camera image display area 84 (i.e., move the objects) by dragging, etc.

Figure 9:
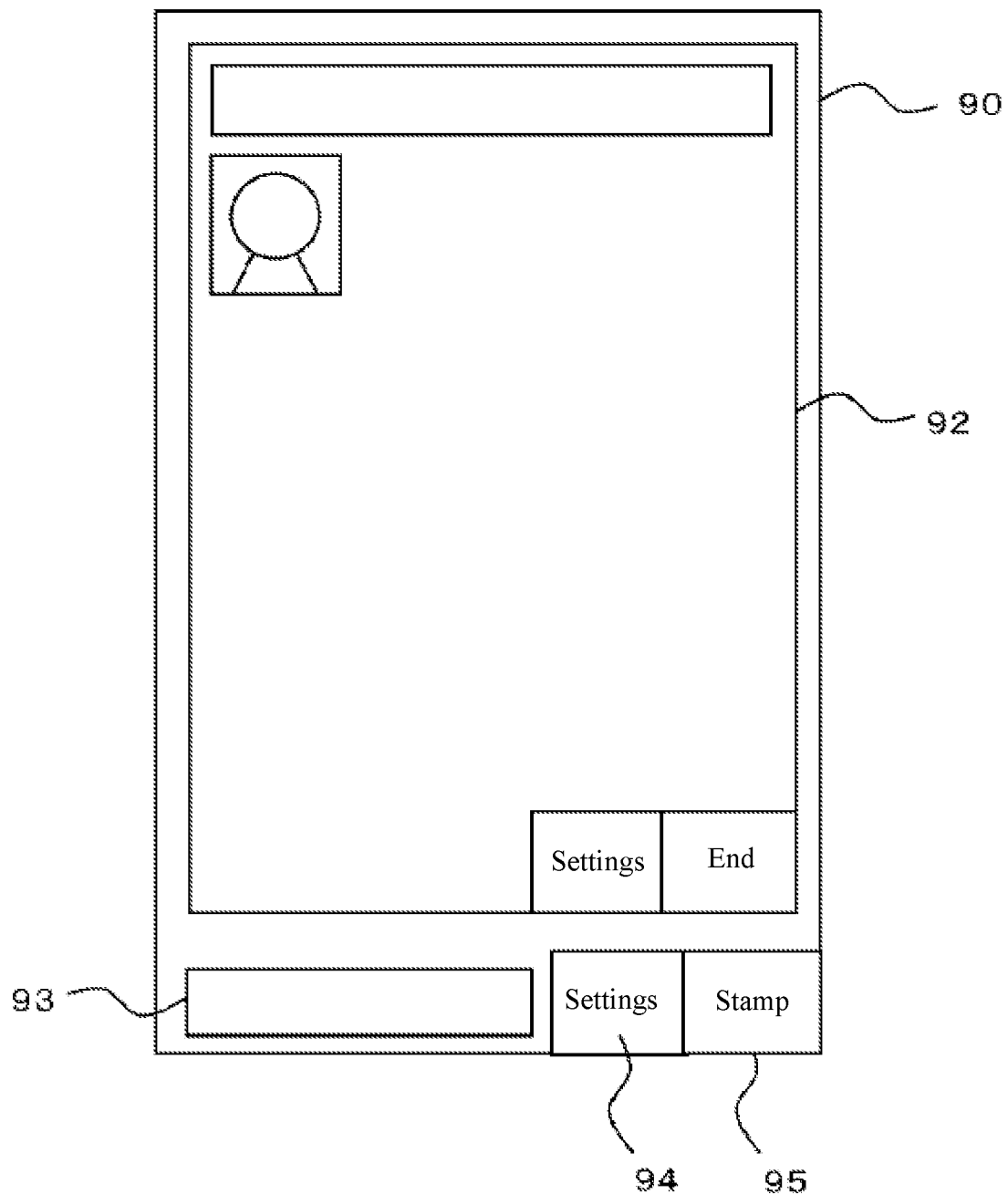
FIG. 9 An example of a viewing screen 90.

FIG. 9 shows an example of a viewing screen 90 displayed on the user terminal 30 of the viewing user viewing screen video. The viewing user can, for example, select a video to be viewed by selecting one of the videos displayed in the recommendation area 61 and the video list area 62 of the main screen 60, by selecting one of the videos found by a search through the search menu 104, or the like, and the viewing screen 90 that displays the corresponding screen video is displayed on the user terminal 30 of the viewing user according to this video selection.

As shown in FIG. 9, the viewing screen 90 has a video display area 92 in which screen video is displayed, a comment input area 93 located in the lower-left corner of the screen, and a settings button 94 and a stamp button 95 located in the lower-right corner of the screen. As shown in FIG. 9, the video display area 92 displays screen video corresponding to the display screen (distribution screen 80) at the user terminal 30 of the distribution user.

The comment input area 93 is configured to allow the user to input text strings or other such comments. When the user selects the settings button 94, various viewing settings can be adjusted through a setting screen (not shown).

Figure 10:
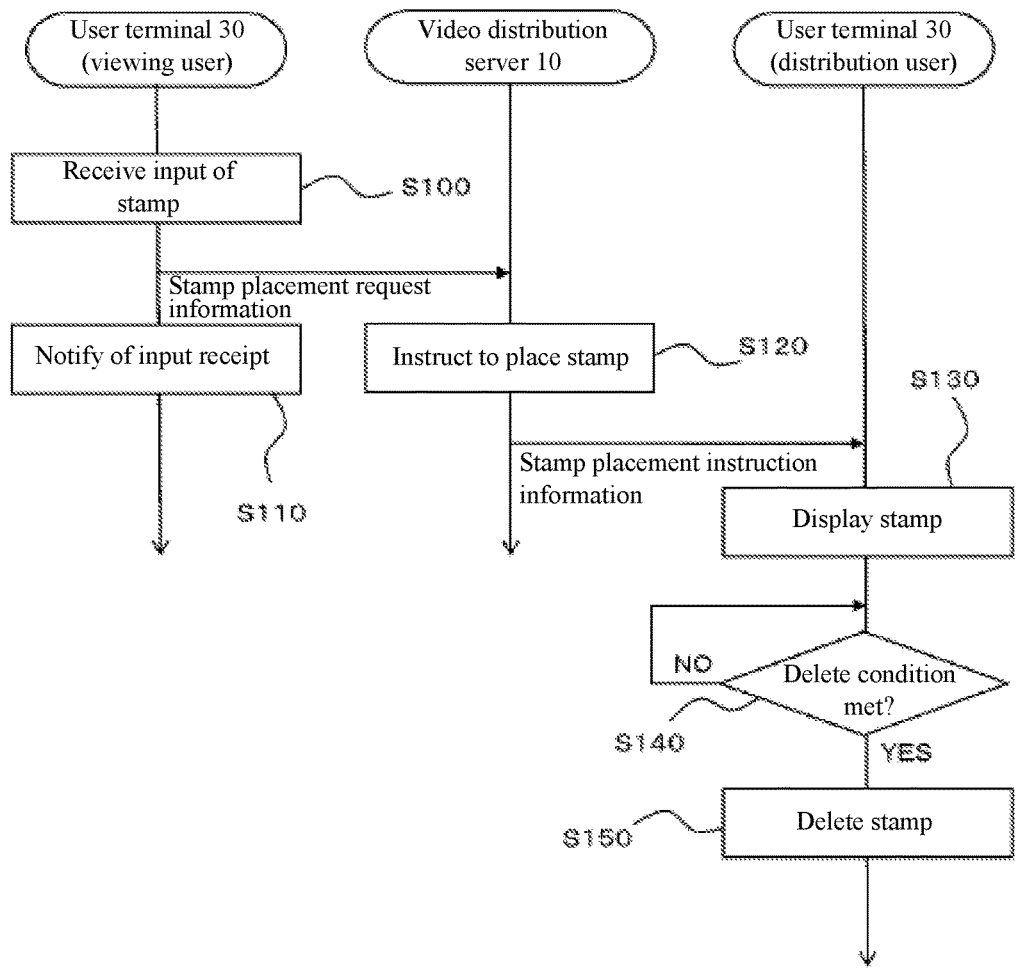
FIG. 10 A sequence diagram giving an example of communication related to the placement of stamps in the video distribution system 1.

The stamp input button 95 of the viewing screen 90 is used by a viewing user to request the placement of a stamp on a video. The operation related to the placement of a stamp on a video will now be described. FIG. 10 is a sequence diagram giving an example of communication related to the placement of stamps, which is executed between the user terminal 30 of a viewing user, the video distribution server 10, and the user terminal 30 of the distribution user. First, the user terminal 30 of the viewing user receives the input of a stamp by the viewing user (step S100).

Figure 11:
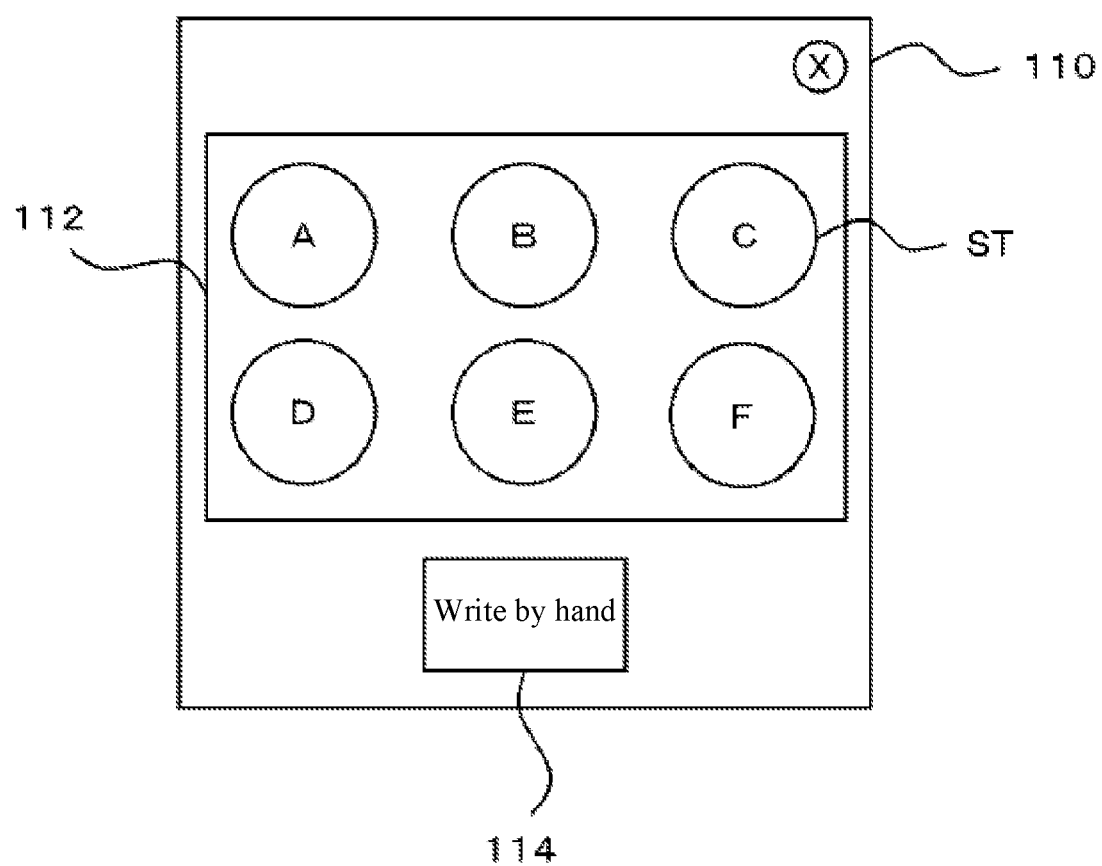
FIG. 11 An example of a stamp input screen 110.

FIG. 11 shows an example of a stamp input screen 110 that is displayed over the viewing screen 90 upon the selection of the stamp input button 95 of the viewing screen 90. As shown in FIG. 11, the stamp input screen 110 has a stamp display area 112 that displays a list of a plurality of stamps ST, and a handwritten stamp input button 114 that is displayed as "Write by hand." The stamps ST displayed in the stamp display area 112 are stamps that are owned by the viewing user. Stamps owned by the viewing user are managed in owned stamp information in the user information table 411. This owned stamp information is synchronously stored and managed at the user terminal 30 of the viewing user.

Figure 12:
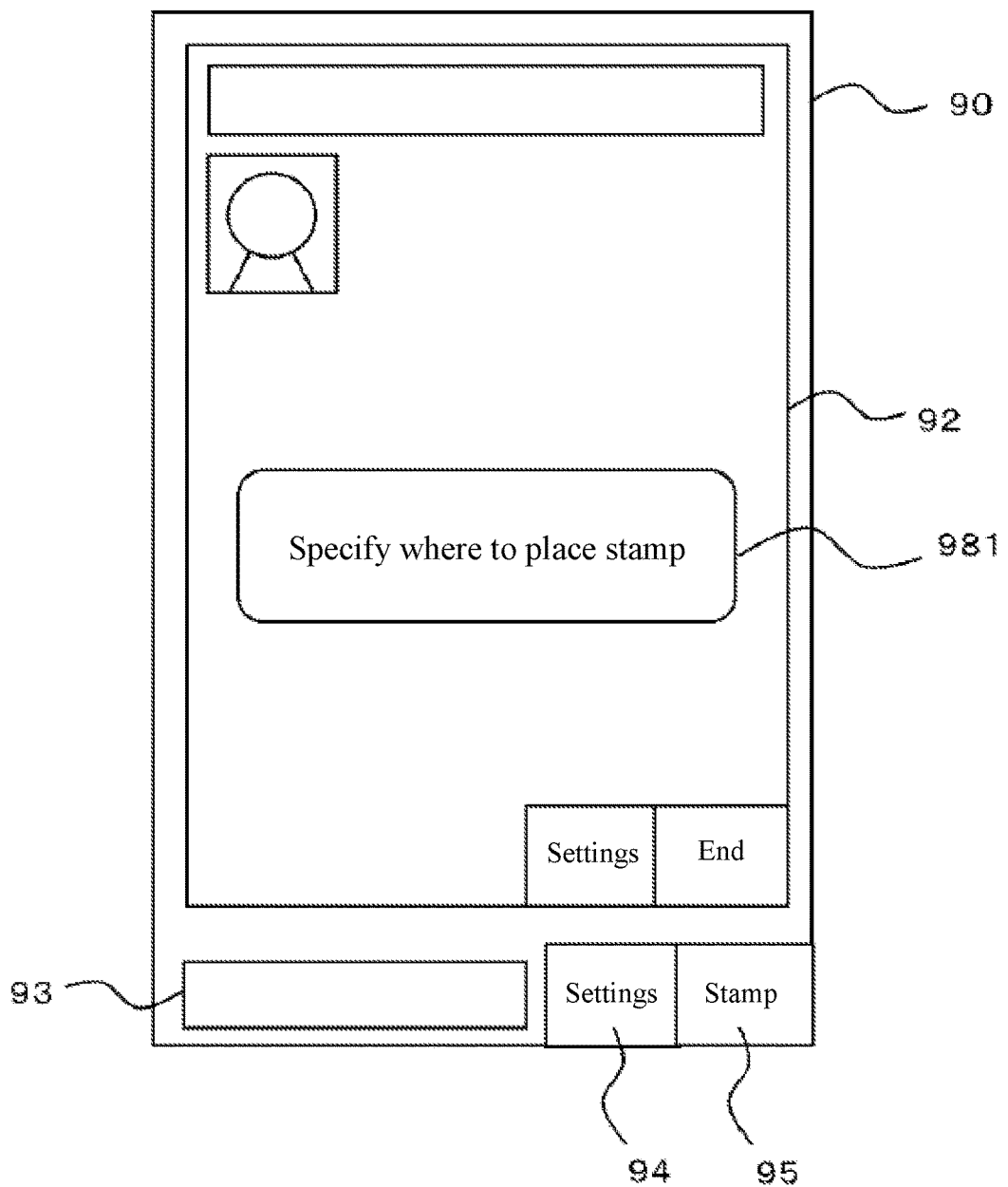
FIG. 12 An example of the viewing screen 90 displaying an information notification region 981.

When the viewing user selects one of the stamps ST displayed in the stamp display area 112, the stamp input screen 110 is closed and, as shown in the example in FIG. 12, an information notification area 981 is displayed on the viewing screen 90. As shown in FIG. 12, this information notification area 981 displays text that says "Specify where to place the stamp." The viewing user can tap, etc., at some location within the video display area 92 of the viewing screen 90 to specify the location where the stamp is to be placed.

Figure 13:
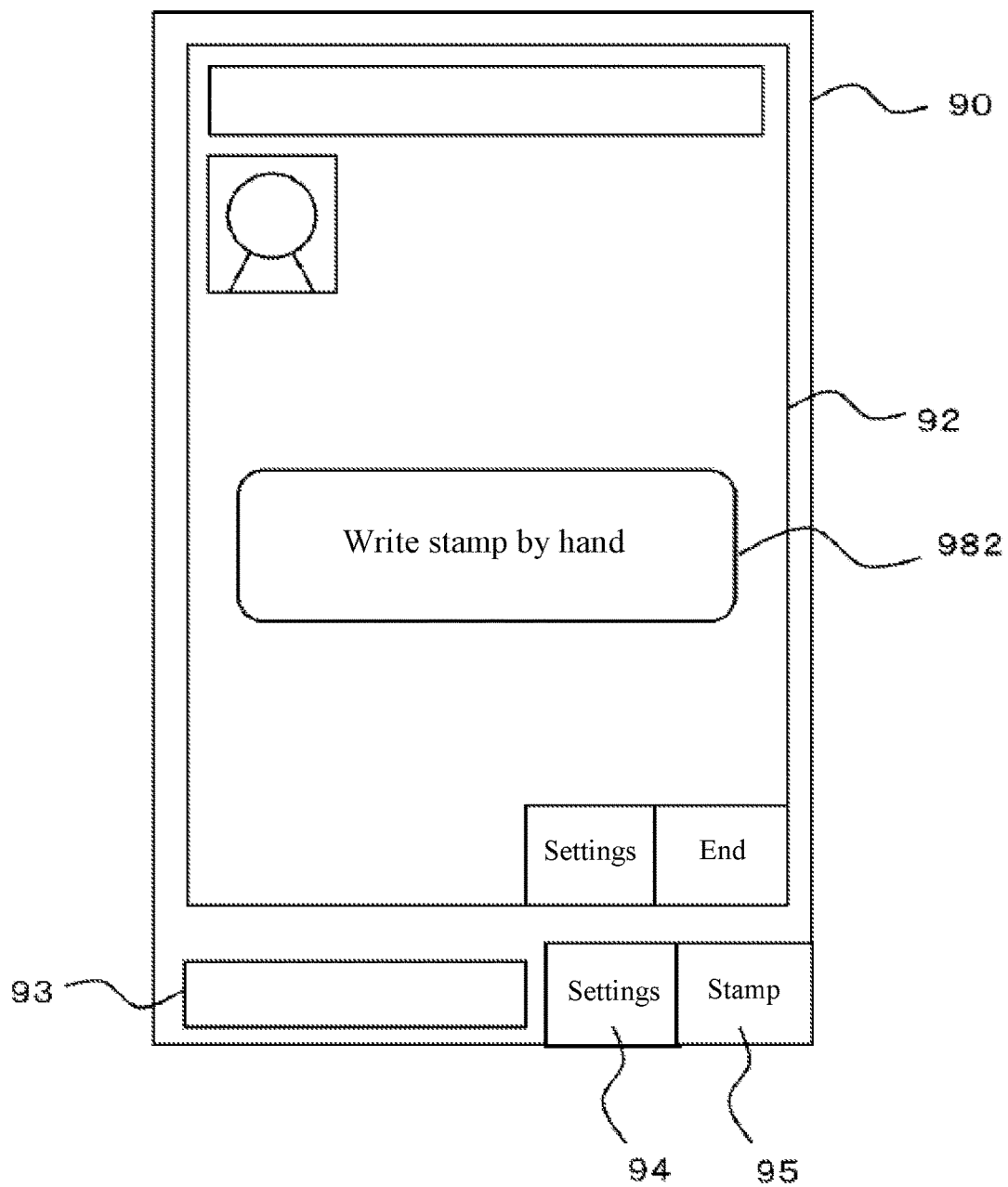
FIG. 13 An example of the viewing screen 90 displaying an information notification region 982.

Also, when the viewing user selects the handwritten stamp input button 114, the stamp input screen 110 is closed and, as shown in the example in FIG. 13, an information notification area 982 is displayed on the viewing screen 90. As shown in FIG. 13, the information notification area 982 displays text that says "Write stamp by hand." The viewing user can produce a handwritten stamp by the freehand drawing of letters, a picture, etc., by touch input, etc., within the video display area 92 of the viewing screen 90. When a stamp is handwritten, the position of the handwriting within the video display area 92 is specified as the position where the stamp is to be placed.

Going back to the sequence diagram in FIG. 10, when the position where the stamp is to be placed is specified, a stamp input (an image object placement request) is received (step S100). Along with the receipt of this stamp input, the user terminal 30 of the viewing user sends the video distribution server 10 stamp placement request information to request the placement of the stamp. The stamp placement request information includes a stamp ID (in the case of a handwritten stamp, image data for the stamp) that identifies the stamp selected through the stamp display area 112 of the stamp input screen 110, a user ID that identifies the viewing user, and information (coordinates in the video display area 92, etc.) about the position where the stamp is placed on the video, which is specified by tapping, etc., within the video display area 92 of the viewing screen 90.

Figure 14:
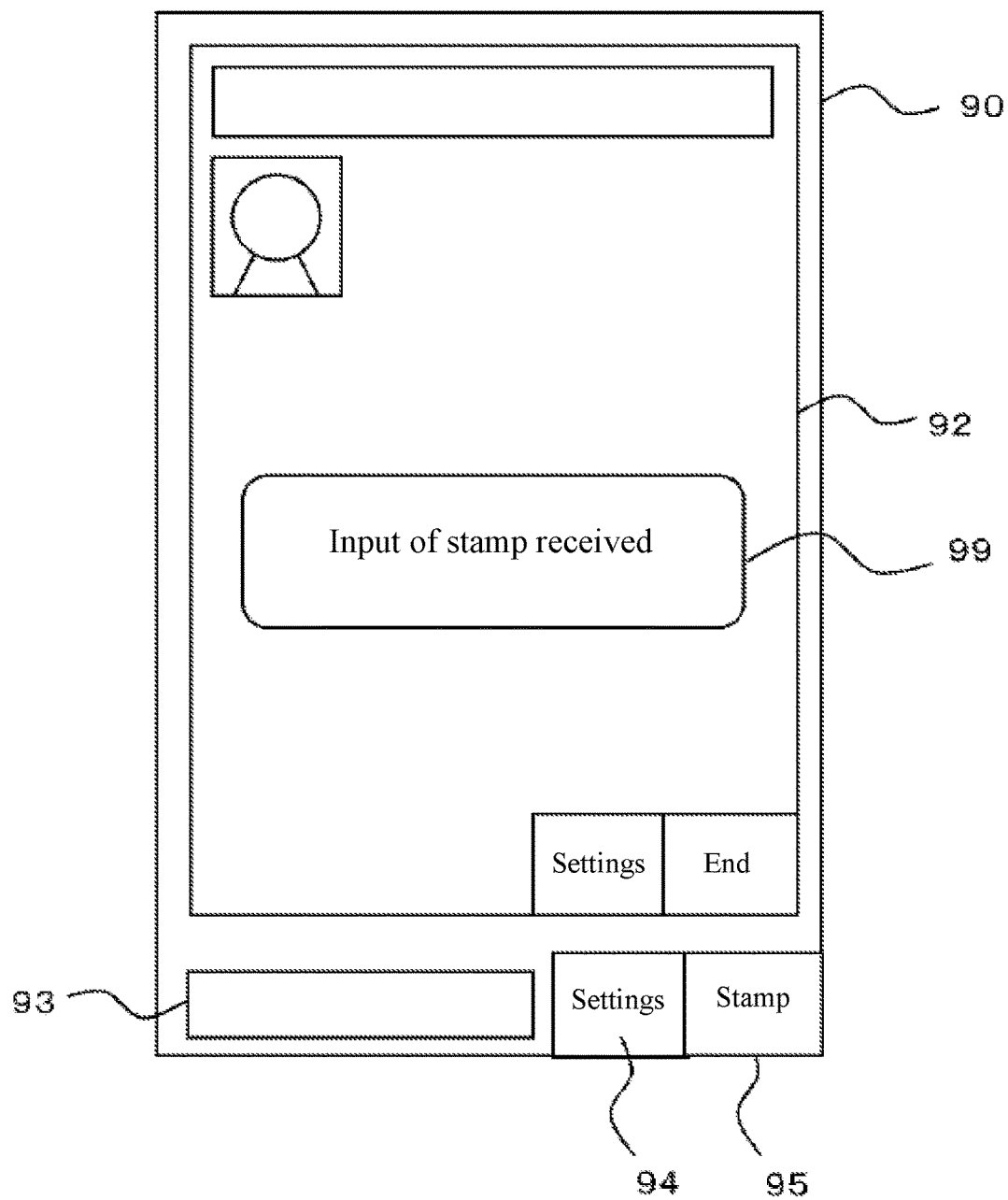
FIG. 14 An example of the viewing screen 90 displaying an information notification region 99.

The user terminal 30 of the viewing user, to which stamp placement request information has been sent upon the receipt of a stamp input, then notifies the viewing user who inputted this stamp that the stamp input has been received (step S110). More specifically, as shown in the example in FIG. 14, an information notification area 99 is displayed in the viewing screen 90. This information notification area 99 displays text that says "Stamp input received." This notification allows the viewing user to confirm that the input of the stamp was properly received, even though the placement of the stamp is not reflected in the screen video displayed in the video display area 92. As a result, it is less likely that a viewing user will repeatedly make unnecessary inputs of the stamp because the inputted stamp is not reflected in the screen video.

Furthermore, in this specific example, the information notification area 99 displayed in the viewing screen 90 is automatically deleted once a specific length of time (such as three seconds) has elapsed. Also, the viewing screen 90 is configured so that the stamp input button 95 cannot be selected while the information notification area 99 is being displayed. That is, the viewing screen 90 is configured so that the next stamp cannot be inputted until a specific length of time has elapsed since the input of the previous stamp. Thus, the number of stamps that can be inputted by a viewing user within a specific length of time in the viewing screen 90 is limited to one. This limitation helps to avoid a scenario in which too many stamps will be placed on the video.

Going back to the sequence diagram in FIG. 10, upon receiving the stamp placement request information from the user terminal 30 of the viewing user, the video distribution server 10 instructs the user terminal 30 of the distribution user to place the stamp (step S120). More specifically, the video distribution server 10 sends the stamp placement instruction information to the user terminal 30 of the distribution user. The stamp placement instruction information includes the stamp ID, image data for the stamp, the account name of the viewing user, the position in the video where the stamp is to be placed, and how long the stamp is to be displayed. Except for handwritten stamps, the stamp image data is managed in the object information table 413, the account names of viewing users are managed in the user information table 411 (basic information), and the stamp display times are managed in the object information table 413.

Figure 15:
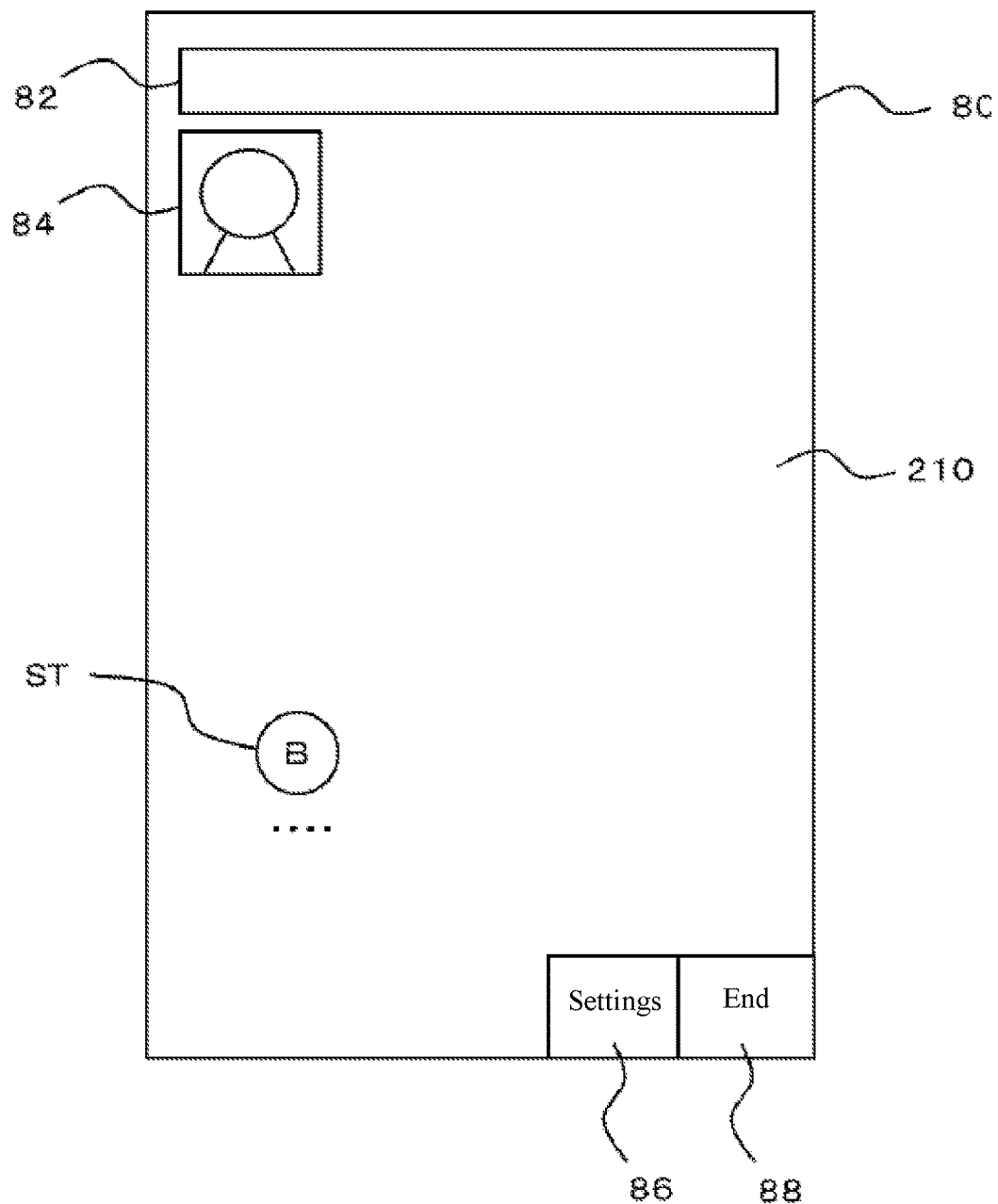
FIG. 15 An example of the distribution screen 80 on which a stamp is displayed.

The user terminal 30 of the distribution user that has received the stamp placement instruction information displays the stamp on the distribution screen 80 on the basis of the received stamp placement instruction information (step S130). FIG. 15 shows an example of the distribution screen 80 on which a stamp ST is displayed. The stamp ST is displayed on the basis of the image data and stamp ID included in the stamp placement instruction information, and the display position thereof is a position on the distribution screen 80 corresponding to the position on the video that is similarly included in the stamp placement instruction information. The account name included in the stamp placement instruction information (the account name of the viewing user who inputted the stamp ST) is displayed below the stamp ST. When a stamp is thus displayed on the distribution screen 80 of the user terminal 30 of the distribution user, it is reflected in the screen video sent from this user terminal 30, and screen video in which the stamp is displayed ends up being displayed on the viewing screen 90 (in the video display area 92) at the user terminals 30 of a plurality of viewing users. Thus, the viewing users can enjoy communicating with the distribution user and with other viewing users through the placement of a stamp on the video. Also, the inputting of the stamp can be carried out more easily than the inputting of comments, etc.

In this specific example, the stamp ST displayed on the distribution screen 80 is a widget-style object controlled by an application for the video distribution service, etc., that runs in the background, just as with the comment input area 82, the camera image display area 84, the settings button 86, and the end button 88. The distribution user can change the display position of the stamp ST (i.e., move the stamp) by dragging, etc. For example, in a situation in which a stamp has been placed over an important portion of the screen of another application displayed in the display area 210, the distribution user can move that stamp.

Going back to the sequence diagram in FIG. 10, the displayed stamp continues to be displayed until a deletion condition is met, and is deleted once that deletion condition has been met (steps S140 and S150). In this specific example, the stamp is deleted when the elapsed time since the start of display has reached the display time set for each stamp (that is, one deletion condition is that this elapsed time reaches the display time). More specifically, the user terminal 30 of the distribution user deletes the stamp when the elapsed time since the start of display has reached the display time included in the stamp placement instruction information. Thus, the stamp display time in this example is set for each stamp. In another specific example, the stamp display time is set for each user. In this case, the display time for each user is managed in the user information table 411, for example.

Figure 16:
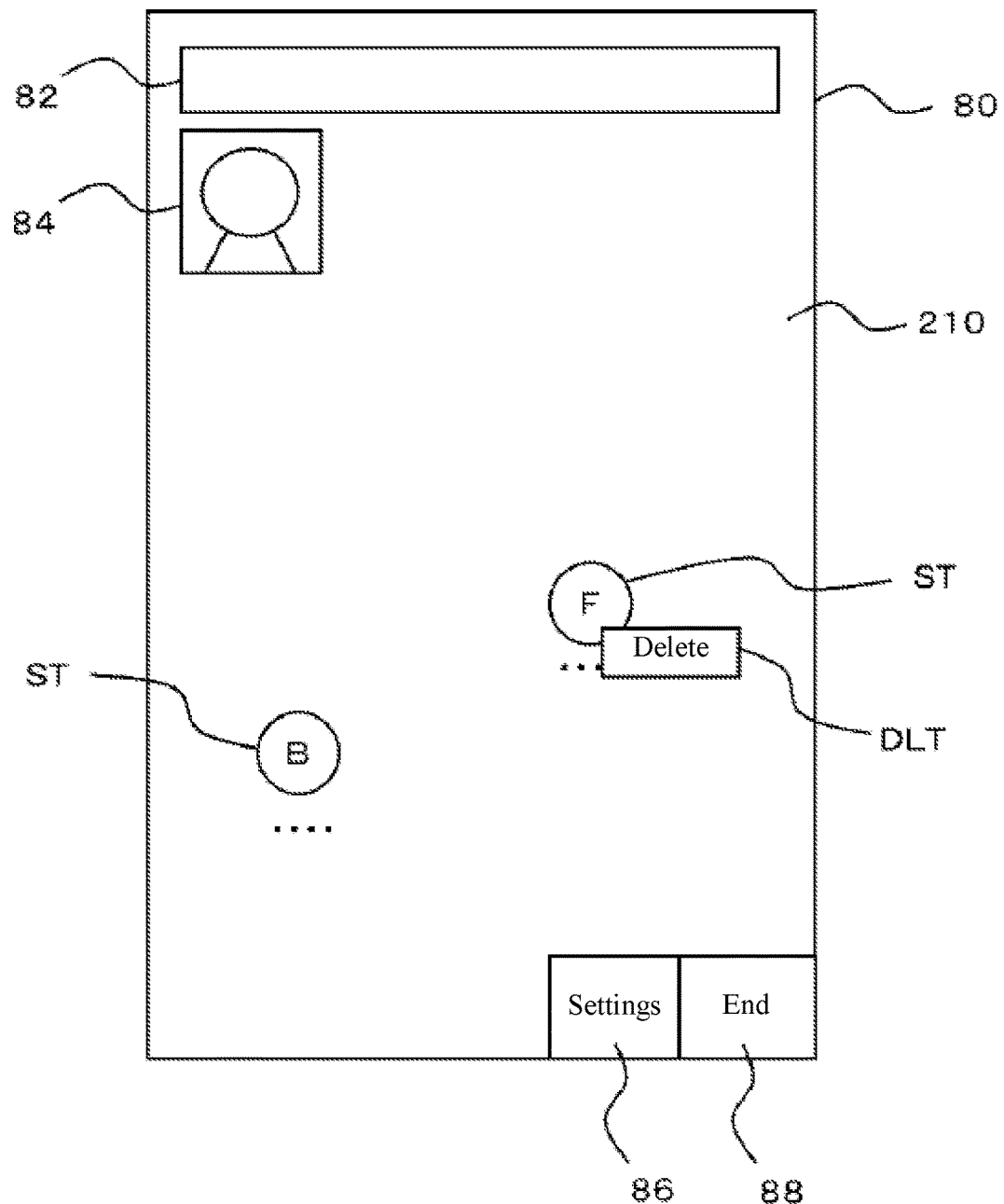
FIG. 16 An example of the distribution screen 80 on which a stamp is displayed.

Also, in this specific example, even if the elapsed time since the start of display has not reached the display time, the stamp will be deleted in response to a request from the distribution user (that is, one deletion condition is that the distribution user has requested deletion). The distribution screen 80 is configured so that when the stamp being displayed is continually pressed or otherwise manipulated, a delete command object DLT will be displayed to the lower-right of the stamp, as shown in the example in FIG. 16. When the distribution user selects the delete command object DLT, the corresponding stamp (in the example in FIG. 16, the stamp ST displayed as "F") is deleted. If the elapsed time since the start of display has not reached the display time, a stamp that has already been deleted may be displayed again in response to a request from the distribution user.

Thus, the placement of stamps inputted from the plurality of viewing users on the video (their display on the distribution screen 80) and their deletion are repeatedly executed during distribution of the screen video. When the distribution user then selects the end button 88 on the distribution screen 80, the distribution of video by that distribution user ends.

In the specific example discussed above, the distribution user may be given a reward (such as digital content that can be used with the video distribution service (virtual currency, items, etc.)) on the basis of information related to the stamps inputted during video distribution. For example, when the number of inputted stamps is at or over a specific number, the distribution user can be given a reward based on the number of stamps.

Also, in the specific example discussed above, at least some of the plurality of stamps that can be inputted by viewing users can be stamps of different display size. In this case, the display time set for each stamp may be shorter the larger is the display size of the stamp. This will result in stamps being deleted in a shorter time the larger is their display size, making it easier to maintain good visibility of the screens of other applications displayed in the display area 210 of the distribution screen 80.

Also, in the specific example discussed above, at least some of the stamps that can be inputted by viewing users can be configured as stamps that move over the video. In this case, when a stamp is inputted, the viewing users can specify the position in the video that will be the starting point of movement (the position of initial placement) and the position that will be the end point of movement.

Also, in the specific example discussed above, at least some of the stamps that can be inputted by viewing users can be configured as stamps that change on the basis of what is displayed in the video. Such stamps change in position, shape, and/or size, etc., on the basis of the specific object that is displayed in the video (such as the face of the distribution user, a game character, etc.) In this case, the user terminal 30 of the distribution user, for example, continuously recognizes the specific object by analyzing what is displayed on the distribution screen 80, and changes the position, shape, and/or size, etc., of the stamp so as to match the recognized specific object (as a result, for example, a stamp having the appearance of a hat is displayed to move closer to the position of the head of the distribution user).

The video distribution system 1 in the embodiment described above is such that an image object specified by a viewing user is placed on a video in response to the receipt of a placement request for an image object (such as a stamp) by the viewing user during the distribution of a real-time video provided by a distribution user (such as during the live streaming of a screen). As a result, the viewing users can enjoy communicating with other users through the placement of image objects on the video being viewed. That is, an embodiment of the present invention can promote communication among users during the distribution of video.

The video distribution system 1 in the embodiment described above was configured such that only a viewing user placed an image object on the video, but in another embodiment of the present invention, image objects are placed on a video by a distribution user in addition to viewing users. In this case, the distribution function controller 55 of the user terminal 30 can be configured to place an image object specified by a distribution user on the video in response to an image object placement request by a distribution user.

Besides what was expressly described above, the processing and procedures described in this Specification can be realized by software, hardware, or a suitable combination of these. For example, the processing and procedures described in this Specification can be realized by implementing logic corresponding to said processing and procedures in an integrated circuit, a volatile memory, a non-volatile memory, a magnetic disk, or another such medium. Also, the processing and procedures described in this Specification can be implemented as a computer program (e.g., non-transitory computer-readable medium having a storage including instructions to be performed by a processor) corresponding to said processing and procedures, and can be executed by any of various kinds of computer.

Although the processing and procedures described in this Specification were described as being executed by a single device, software, component, or module, such processing and procedures can be executed by a plurality of devices, a plurality of sets of software, a plurality of components, and/or a plurality of modules. Also, the elements of the software and hardware described in this Specification can be realized by combining them into fewer constituent elements, or by breaking them up into more constituent elements.

In this Specification, both when the constituent elements of the invention are described as being either singular or plural, and when they are described as being limited to neither singular nor plural, except when the context dictates that they should be interpreted otherwise, these constituent elements may be either singular or plural.

DESCRIPTION OF THE REFERENCE NUMERALS

1 Video distribution system
10 Video distribution server
20 Network
30 User terminal
41 Information storage manager
43 Basic function controller
45 Video distribution controller
47 Object placement manager
51 Information storage manager
53 Viewing function controller
55 Distribution function controller
60 Main screen
70 Distribution preparation screen
80 Distribution screen
90 Viewing screen
110 Stamp input screen
210 Display area

The invention claimed is:

1. A system for distributing video, the system comprising:
one or more computer processors, wherein the one or more computer processors execute the following operations in response to the execution of a computer-readable command:
processing to distribute real-time video provided by a distribution user to each of a plurality of viewing users;
processing to receive from a viewing user a request to place an image object on a video during the distribution of the video, the request comprising a placement request that includes information related to the image object specified by the viewing user; and
processing to place the image object specified by the viewing user on the video in response to a receipt of the placement request.

2. The system according to claim 1,
wherein the processing to distribute includes distributing, as the video, a display screen at a user terminal of the distribution user, and
the processing to place includes displaying the image object specified by the viewing user on the display screen at the user terminal of the distribution user.

3. The system according to claim 1,
wherein the processing to receive includes receiving from the viewing user the placement request including information related to a position on the video specified by the viewing user, in addition to information related to the image object specified by the viewing user, and
the processing to place includes placing the image object specified by the viewing user at the position on the video specified by the viewing user.

4. The system according to claim 3, wherein the processing to receive includes receiving from the viewing user the placement request including information related to an image object specified and generated based on handwritten input by the viewing user in a video display region in which the video is displayed at the user terminal of the viewing user, as well as information related to a position on the video specified by the handwritten input.

5. The system according to claim 1, wherein the processing to receive includes receiving from the viewing user the placement request including information related to an image object specified by the viewing user from among a plurality of image objects.

6. The system according to claim 1, wherein the one or more computer processors further execute processing to notify the viewing user of the receipt of the placement request in response to the receipt of the placement request.

7. The system according to claim 1, wherein the processing to receive includes limiting the number of placement requests by the viewing user that can be received within a specific length of time.

8. The system according to claim 1,
wherein the one or more computer processors further execute processing to delete an image object for which the elapsed time since being placed on the video has reached a specific placement duration, and the specific placement duration is set for every image object.

9. The system according to claim 1,
wherein the one or more computer processors further execute processing to delete an image object for which the elapsed time since being placed on the video has reached a specific placement duration, and the specific placement duration is set for every viewing user.

10. The system according to claim 1, wherein the one or more computer processors further execute processing to delete an image object placed on the video in response to a delete request from the distribution user for deleting an image object placed on the video.

11. The system according to claim 1, wherein the one or more computer processors further execute processing to change the position on the video of an image object placed on the video in response to a position change request from the distribution user for changing the position in the video of an image object placed on the video.

12. A method for distributing video, executed by one or more computers, the method comprising the steps of:
- distributing, by the one or more computers, real-time video provided by a distribution user to each of a plurality of viewing users;
- receiving from a viewing user, by the one or more computers, a request to place an image object on a video during the distribution of the video, the request comprising a placement request that includes information related to the image object specified by the viewing user; and
- placing, by the one or more computers, the image object specified by the viewing user on the video in response to a receipt of the placement request.

13. A non-transitory computer-readable medium having a storage including instructions to be performed by a processor for distributing video, the instructions causing one or more computers to execute the following operations:
- processing to distribute real-time video provided by a distribution user to each of a plurality of viewing users;
- processing to receive from a viewing user a request to place an image object on a video during the distribution of the video, the request comprising a placement request that includes information related to the image object specified by the viewing user; and
- processing to place the image object specified by the viewing user on the video in response to a receipt of the placement request.

* * * * *